No. 681,092.             Patented Aug. 20, 1901.

O. P. BAILER.
EYEGLASSES.
(Application filed May 10, 1901.)

(No Model.)

WITNESSES:
Jos. A. Ryan
Perry B. Turpin

INVENTOR
Otto P. Bailer.
BY Munn & Co.
ATTORNEYS.

THE NORRIS PETERS CO., PHOTO-LITHO., WASHINGTON, D. C.

UNITED STATES PATENT OFFICE.

OTTO P. BAILER, OF MEMPHIS, TENNESSEE.

EYEGLASSES.

SPECIFICATION forming part of Letters Patent No. 681,092, dated August 20, 1901.

Application filed May 10, 1901. Serial No. 59,585. (No model.)

*To all whom it may concern:*

Be it known that I, OTTO P. BAILER, residing in Memphis, in the county of Shelby and State of Tennessee, have made certain new and useful Improvements in Eyeglasses, of which the following is a specification.

My invention is an improvement in eyeglasses, and particularly in the devices for connecting the post with the bow-spring; and the invention has for an object to provide means by which to prevent the screw which connects the post and bow-spring from accidentally becoming loose.

The invention consists in certain novel constructions and combinations of parts, as will be hereinafter described and claimed.

Figure 1:
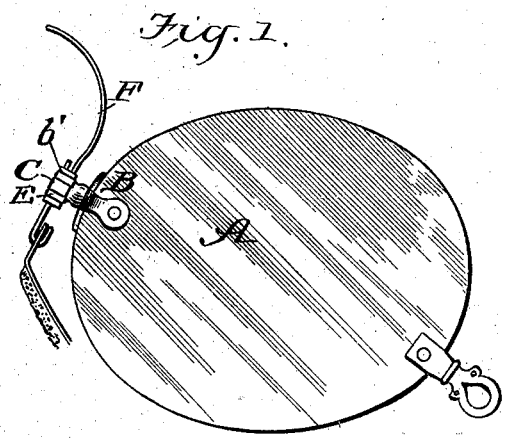
Figure 2:
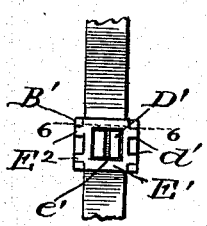
Figure 3:
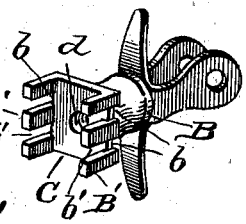
Figure 4:
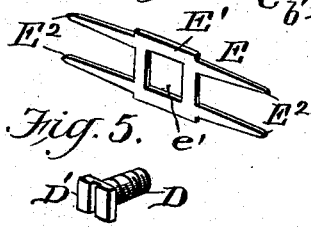
Figure 5:
Figure 6:
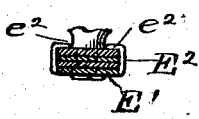

In the drawings, Figure 1 is a face view of a portion of a pair of eyeglasses embodying my invention. Fig. 2 is a face view showing the head of the fastening-screw and the locking-plate applied thereto and to the flanged end of the post. Fig. 3 is a detail perspective view of the post. Fig. 4 is a detail perspective view of the locking-plate. Fig. 5 is a detail perspective view of the screw, and Fig. 6 is a cross-sectional view on about line 6 6 of Fig. 2.

The glass A may be secured to the post B in any suitable manner, the post being provided with the end flanges B', projecting from its opposite sides and forming a recess C to receive the head D' of the screw D and also to receive the body portion E' of the locking-plate E. The flanges B' are slotted at $b'$ in line with notches $b$ in the base-plate, from which said flanges project. In practice the spring-bow F may be seated in the recess C against the base-plate of the post and the screw D be turned through a suitable opening in the spring F and into a socket $d$ formed in the post, and the screw may be tightened to hold such parts securely together. The head D' of the screw is non-circular, being shown as angular, and the plate E' of the lock E has an opening $e'$ to fit the said head D', which is applied as shown in Fig. 2 and has its end arms $E^2$ bent into the slots $b'$ and notches $b$ and clenched beneath the base-plate of the post, as shown at $e^2$ in Fig. 6. When thus applied, as shown in Figs. 1, 2, and 6, the locking-plate and the screw-head will be seated in the recess of the post, and the arms $E^2$ of the locking-plate will seat in the slots $b'$ and notches $b$ and rest flush with the outer surfaces of the flanges B', avoiding all obstructions or projections on the flanged end of the post, as will be understood from Figs. 1, 2, and 6.

By the described invention the fastening-screw will be positively locked in turning by means of the locking-plate, which can be readily removed whenever for any reason it is desired to release the screw D.

In the use of the expression "non-circular" in the foregoing description and appended claims I wish it understood that I mean to distinguish thereby from a head and an opening to receive the same, which are circular, as in my device the head cannot turn in the opening in the plate, it being manifest that while I have shown the head D' as angular in cross-section it might be made of other cross-sectional form than that of the circle, so it could not turn when fitted in a corresponding opening in the plate E.

Having thus described my invention, what I claim, and desire to secure by Letters Patent, is—

1. The combination in an eyeglass of the bow-spring, the post having a base-plate and provided at the opposite sides thereof with flanges having slots and also having notches in the base-plate in line with said slots, the fastening-screw having a non-circular head and seated between the flanges of the post and the locking-plate having a main portion fitting between the flanges of the post and provided with an opening receiving the head of the screw, said locking-plate having the end arms bent within the slots of the flanges and the notches of the base-plate and clenched beneath the said plate substantially as shown and described.

2. The combination in an eyeglass of the post having flanges and a seat for the screw between said flanges, the screw having a non-circular head arranged to lie between the said flanges, and the locking-plate having its main portion lying between the said flanges and provided with an opening to receive said head and arms bent into engagement with the post substantially as set forth.

3. The combination with the post having the slotted flanges and the screw having its head non-circular and arranged to lie between said flanges, of the locking-plate having its main portion formed to lie between said flanges and having an opening to receive the head of the screw and provided at the ends of the main portion with arms fitting in the slots of the flanges and bent into locking connection with the post substantially as shown and described.

OTTO P. BAILER.

Witnesses:
EDWARD L. BURNS,
JAMES J. CONDON.